(12) United States Patent
Wada

(10) Patent No.: US 11,899,207 B2
(45) Date of Patent: Feb. 13, 2024

(54) DISPLAY DEVICE

(71) Applicant: JVCKENWOOD Corporation, Yokohama (JP)

(72) Inventor: Yuki Wada, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/932,693

(22) Filed: Sep. 16, 2022

(65) Prior Publication Data

US 2023/0015386 A1 Jan. 19, 2023

Related U.S. Application Data

(63) Continuation of application No. PCT/JP2021/034703, filed on Sep. 22, 2021.

(30) Foreign Application Priority Data

Dec. 14, 2020 (JP) ................... 2020-206570

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05); *G02B 2027/011* (2013.01)

(58) Field of Classification Search
CPC ............ G02B 27/0101; G02B 27/0149; G02B 2027/011; G02B 2027/0159; B60K 35/00; B60K 2370/1529; B60K 2370/23; B60K 2370/67; B60R 11/02
See application file for complete search history.

(56) References Cited

U.S. PATENT DOCUMENTS

| | | | | |
|---|---|---|---|---|
| 2018/0188530 A1* | 7/2018 | Kasazumi | .......... | G02B 27/0093 |
| 2019/0079286 A1* | 3/2019 | Wada | .......... | G02B 5/10 |
| 2019/0196187 A1* | 6/2019 | Kasazumi | .......... | G02B 27/0179 |
| 2019/0310474 A1* | 10/2019 | Kobayashi | .......... | G02B 27/0149 |

FOREIGN PATENT DOCUMENTS

| | | | |
|---|---|---|---|
| CN | 110073275 A | | 7/2019 |
| JP | H05-178522 A | | 7/1993 |
| JP | 2018-090121 A | | 6/2018 |
| JP | 2018-092050 A | | 6/2018 |
| JP | 2018090121 A | * | 6/2018 |

OTHER PUBLICATIONS

International Search Report for the corresponding PCT Application No. PCT/JP2021/034703 dated Dec. 14, 2021, 4 pages.
International Preliminary Examination Report on Patentability (II) with Written Opinion of ISA, dated Mar. 7, 2022, 7 pages.

* cited by examiner

*Primary Examiner* — Brent D Castiaux
(74) *Attorney, Agent, or Firm* — Shih IP Law Group, PLLC

(57) ABSTRACT

A display device includes: a display that generates image display light; a concave mirror that reflects the image display light such that the image display light is projected onto a transparent member; and a drive mechanism that moves the display in a range in which a distance from the concave mirror to the display is smaller than or equal to a reference distance at which the image display light traveling from the concave mirror to the transparent member becomes parallel light.

3 Claims, 4 Drawing Sheets

DISPLAY DEVICE

CROSS REFERENCE TO RELATED APPLICATION

This application is a continuation of application No. PCT/JP2021/034703, filed on Sep. 22, 2021, and claims the benefit of priority from the prior Japanese Patent Application No. 2020-206570, filed on Dec. 14, 2020, the entire content of which is incorporated herein by reference.

BACKGROUND OF THE INVENTION

1. Field of the Disclosure

The present disclosure relates to a display device, and more particularly to a display device that displays a virtual image.

2. Description of the Related Art

In recent years, a head-up display may be used as a display device for a vehicle. The head-up display projects image display light onto a windshield of the vehicle or the like, and displays a virtual image based on the image display light so as to be superimposed on a landscape outside the vehicle. The windshield has a front surface and a back surface, and the image display light reflected on each of the front surface and the back surface and visually recognized may be deviated and superimposed, and may appear as a double image. In order to suppress generation of such a double image, a structure has been proposed in which optical paths of a first light beam reflected on a front surface and a second light beam reflected on a back surface are matched with each other (see, for example, JP2018-92050A).

In the above-described prior art, it is assumed that a front surface and a back surface of a transparent member such as the windshield are parallel, and in a case where the front surface and the back surface are not strictly parallel due to a manufacturing error of the transparent member or the like, a double image may be generated.

The present disclosure has been made in view of the above circumstances, and an object thereof is to provide technology for appropriately adjusting a display device in which generation of a double image is suppressed.

SUMMARY OF THE INVENTION

A display device according to an embodiment includes: a display that generates image display light; a concave mirror that reflects the image display light such that the image display light is projected onto a transparent member; and a drive mechanism that moves the display in a range in which a distance from the concave mirror to the display is smaller than or equal to a reference distance at which the image display light traveling from the concave mirror to the transparent member becomes parallel light.

Note that arbitrary combinations of the above components and conversions of components and an expression of the present invention between a method, a device, a system, and the like are also effective as aspects of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENT

Figure 1:
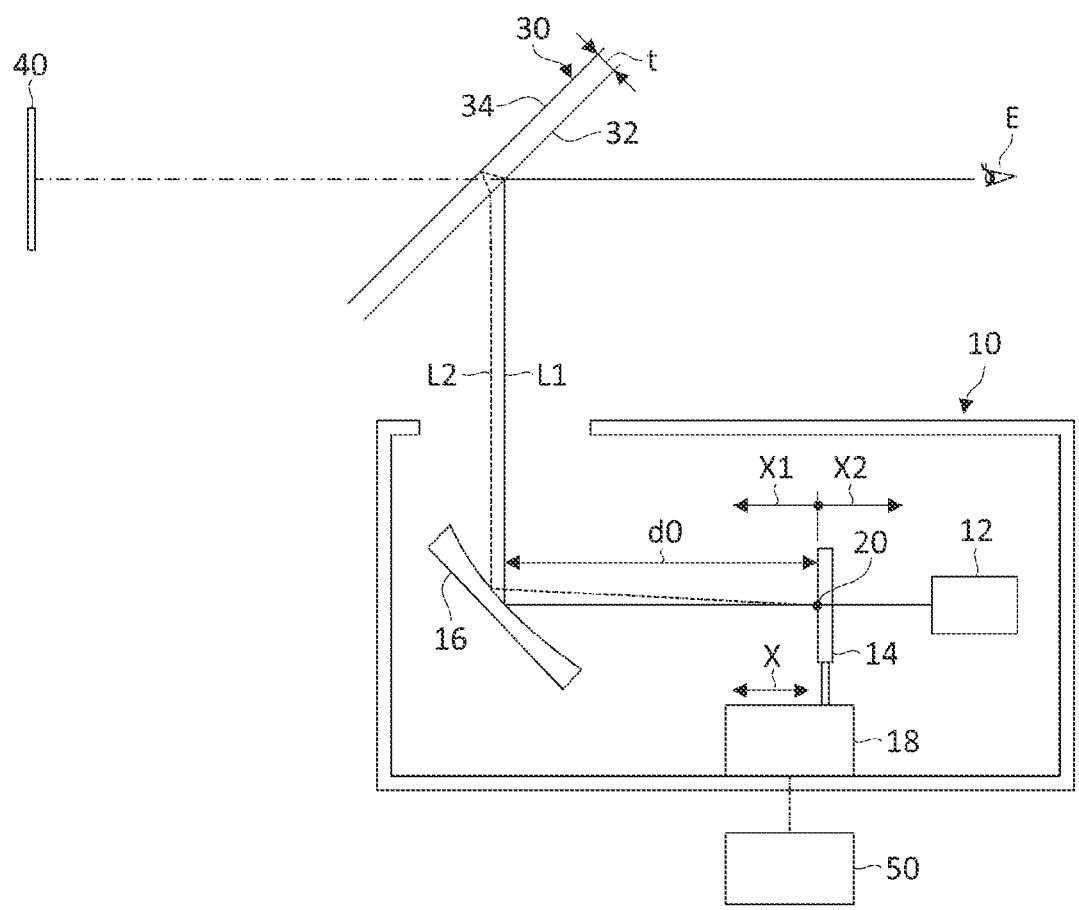
FIG. 1 is a diagram schematically illustrating a structure of a display device according to an embodiment.

The invention will now be described by reference to the preferred embodiments. This does not intend to limit the scope of the present invention, but to exemplify the invention.

Hereinafter, embodiments of the present invention will be described with reference to the drawings. Specific numerical values and the like illustrated in the embodiments are merely examples for facilitating understanding of the invention, and do not limit the present invention unless otherwise specified. Note that, in the present specification and the drawings, elements having substantially the same function and structure are denoted by the same reference numerals and redundant description is omitted, and elements not directly related to the present invention are not illustrated.

FIG. 1 is a diagram schematically illustrating a structure of a display device 10 according to an embodiment. The display device 10 is a so-called head-up display device. The display device 10 projects image display light onto a transparent member 30 such as a windshield of a vehicle to display a virtual image 40 in front of a user E.

The display device 10 includes an illuminator 12, a display 14, a concave mirror 16, and a drive mechanism 18. The illuminator 12 is a light source for generating image display light, and generates illumination light for illuminating the display 14. The illuminator 12 has a light emitting element such as a light emitting diode (LED) or a laser diode (LD), and an optical element for adjusting an intensity distribution or an angle distribution of output light from the light emitting element. The illuminator 12 provides, for example, white light having substantially uniform brightness to the display 14. The structure of the illuminator 12 is not particularly limited, but for example, an optical element such as a light tunnel, a Fresnel lens, or a light diffusion plate can be used in order to adjust the output light from the light emitting element.

The display 14 modulates the illumination light from the illuminator 12 to generate image display light. The display 14 includes a transmissive image display element for generating the image display light, and includes a display device such as a transmissive liquid crystal panel. For example, the image display element acquires a image signal and generates image display light of display contents corresponding to the image signal. The display 14 may further include an optical element for adjusting a direction or a light distribution angle of the image display light. For example, the display 14 may be structured by combining a projection unit, such as a digital mirror device (DMD) or a laser scanning module (LSM) such as liquid crystal on silicon (LCOS) or micro electro mechanical systems (MEMS), other than the transmissive liquid crystal panel, and a transmissive screen such as a microlens array sheet or a light diffusion sheet.

The concave mirror 16 reflects the image display light from the display 14 toward the transparent member 30. The concave mirror 16 is structured such that the image display light traveling from the concave mirror 16 to the transparent member 30 becomes parallel light when the display 14 is disposed at a reference position 20. Specifically, when the display 14 is disposed at the reference position 20, a first light beam L1 and a second light beam L2 emitted from an arbitrary point of the display 14 become parallel to each other and enter the transparent member 30. Here, a distance between the display 14 disposed at the reference position 20 and the concave mirror 16 is also referred to as a "reference distance d0". The reference distance d0 is a distance along a direction in which the image display light travels from the display 14 to the concave mirror 16.

The drive mechanism 18 translates the display 14 as indicated by an arrow X and changes the distance from the concave mirror 16 to the display 14. The direction X in which the display 14 is moved by the drive mechanism 18 is parallel to a direction in which the image display light travels from the display 14 to the concave mirror 16. The drive mechanism 18 moves the display 14 in a range where the distance from the concave mirror 16 to the display 14 is smaller than or equal to the reference distance d0. The drive mechanism 18 allows the display 14 to move in a first direction X1 toward a position closer to the concave mirror 16 than the reference position 20. The drive mechanism 18 prohibits the display 14 from moving in a second direction X2 toward a position farther from the concave mirror 16 than the reference position 20. The movement range of the display 14 by the drive mechanism 18 may be limited by hardware that is a mechanical structure of the drive mechanism 18, or may be limited by software that controls the operation of the drive mechanism 18.

The drive mechanism 18 is connected to an operator 50 and is driven in accordance with an input operation to the operator 50. The operator 50 may be a dedicated operation button included in the display device 10, or may be an operation button provided in a vehicle or the like in which the display device 10 is installed. The operator 50 may be, for example, an operation button or a touch panel for a navigation device disposed in a center console or the like of the vehicle. The operator 50 may be a mobile device such as a mobile phone, a smartphone, or a tablet, and operation information may be transmitted from the mobile device to the drive mechanism 18 in a wired or wireless manner.

The drive mechanism 18 changes the position of the display 14 in order to adjust a double image that can be generated according to an error in parallelism of the transparent member 30. After installing the display device 10, the user E operates the operator 50 while visually recognizing the virtual image 40 displayed via the transparent member 30. For example, the user E operates the operator 50 so that the double image is eliminated in a case where the double image is perceived as the virtual image 40. The double image generated in the display device 10 will be described below.

FIG. 1 illustrates a case where a front surface 32 and a back surface 34 of the transparent member 30 are parallel to each other, and a thickness t between the front surface 32 and the back surface 34 is uniform. The light beams L1 and L2 incident on the transparent member 30 from the concave mirror 16 are reflected by the front surface 32 or the back surface 34 of the transparent member 30 and directed to the user E. The first light beam L1 is reflected by the front surface 32 of the transparent member 30 and directed to the user E. The second light beam L2 is refracted by the front surface 32 of the transparent member 30, reflected by the back surface 34, and directed to the user E.

In the example of FIG. 1, the first light beam L1 and the second light beam L2 incident on the transparent member 30 are parallel to each other, and the front surface 32 and the back surface 34 of the transparent member 30 are parallel to each other. Therefore, directions (angles) of the first light beam L1 and the second light beam L2 directed to the user E are matched with each other. As a result, the user E can visually recognize the virtual image 40 without perceiving the double image due to the deviation between the first light beam L1 and the second light beam L2. Therefore, if the transparent member 30 is strictly parallel, the double image can be eliminated by disposing the display 14 at the reference position 20. At this time, a distance from the user E to the virtual image 40, that is, a distance at which the user E perceives the virtual image 40 (also referred to as a virtual image distance) is infinite.

Figure 2:
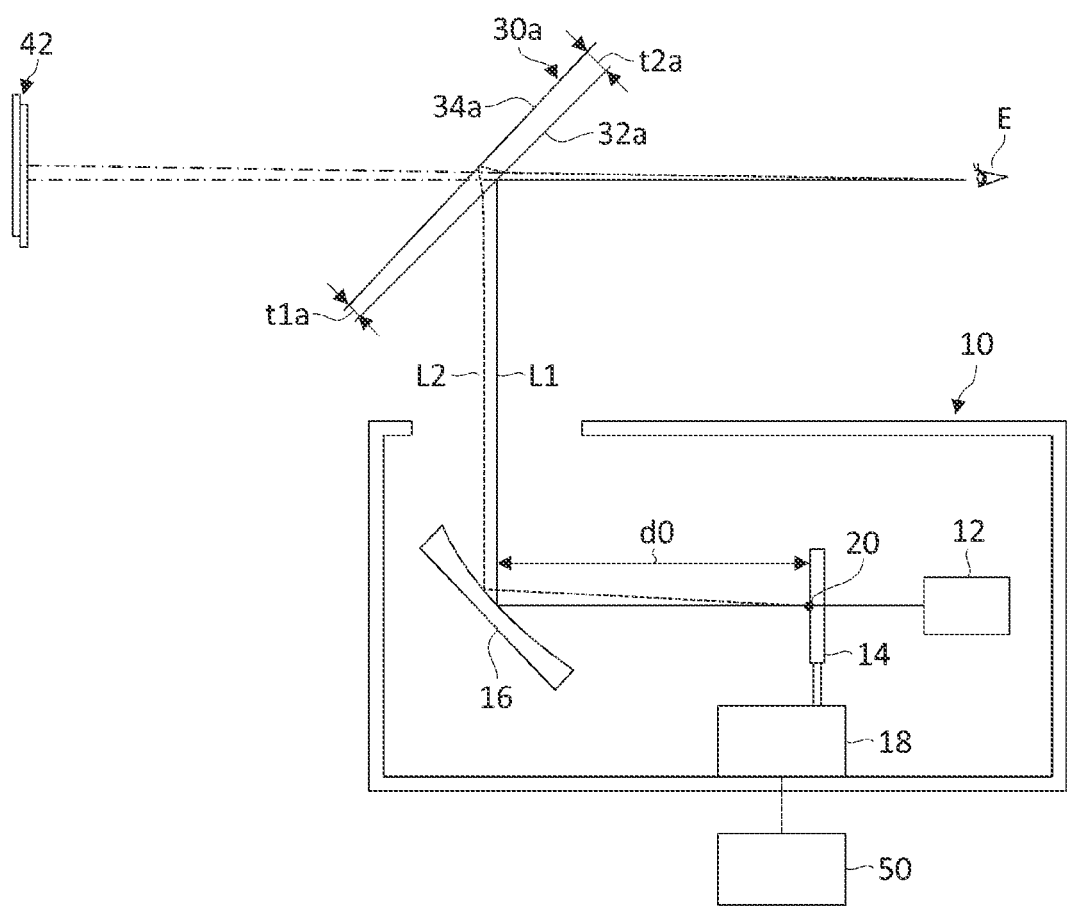
FIG. 2 is a diagram schematically illustrating generation of a double image by a non-parallel transparent member.

FIG. 2 is a diagram schematically illustrating generation of a double image by a non-parallel transparent member 30a. In the transparent member 30a of FIG. 2, unlike the transparent member 30 of FIG. 1, a front surface 32a and a back surface 34a are not parallel. Specifically, a wedge shape is formed such that a thickness t1a on the lower side of the transparent member 30a is small and a thickness t2a on the upper side of the transparent member 30a is large. In FIG. 2, the wedge shape of the transparent member 30a is emphasized for easy understanding, but non-parallelism between the front surface 32a and the back surface 34a of the transparent member 30a may be very small. The non-parallelism of the transparent member 30a may be, for example, a small value caused by a manufacturing error or the like in a case of forming the transparent member 30a, and may be, for example, smaller than or equal to 0.1 or 0.01 degrees.

In the example of FIG. 2, the display 14 is disposed at the reference position 20, and the first light beam L1 and the second light beam L2 incident on the transparent member 30a are parallel to each other. Then, since the front surface 32a and the back surface 34a are not parallel, a deviation in direction (angle) occurs between the first light beam L1 and the second light beam L2 directed to the user E. As a result, the user E visually recognizes a virtual image 42 in which the double image is generated due to the deviation between the first light beam L1 and the second light beam L2.

Figure 3:
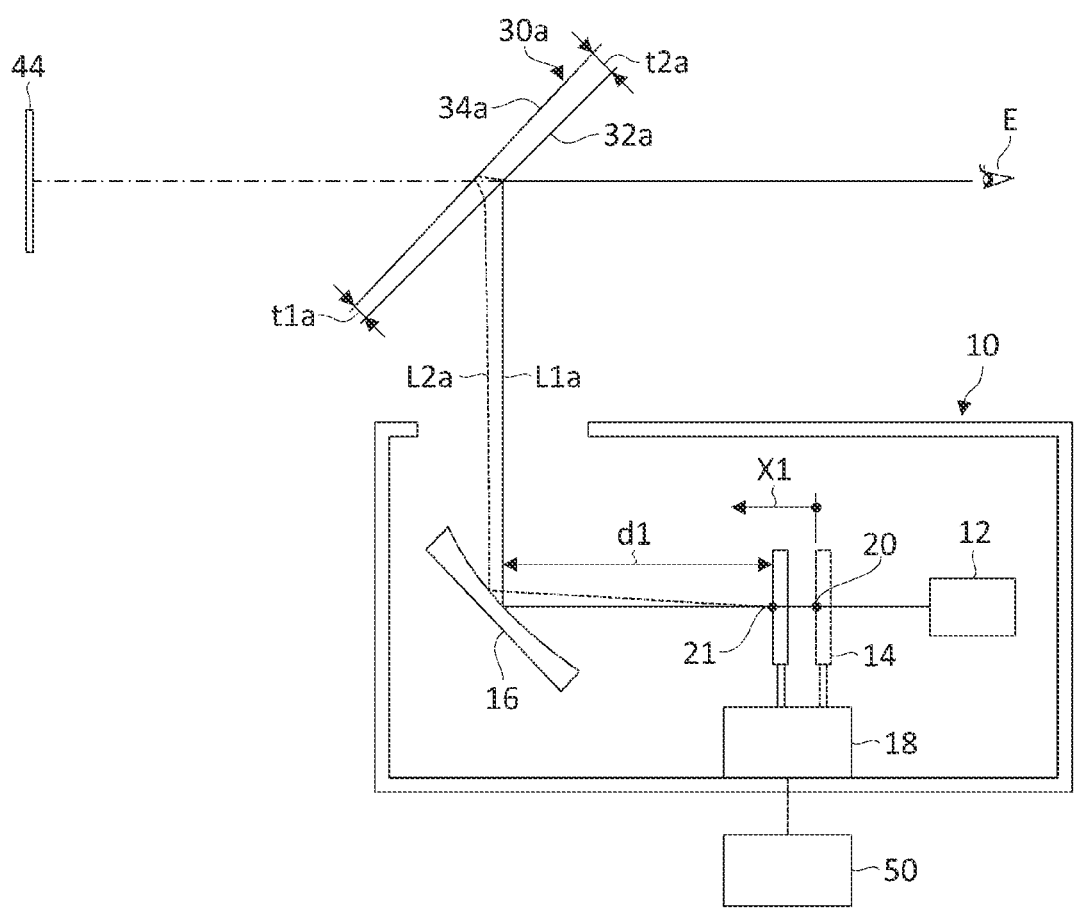
FIG. 3 is a diagram schematically illustrating a method for eliminating a double image by a non-parallel transparent member.

FIG. 3 is a diagram schematically illustrating a method for eliminating a double image by the non-parallel transparent member 30a. The transparent member 30a in FIG. 3 is the same as that in FIG. 2. In FIG. 3, the position of the display 14 is different, and the display 14 is disposed at a near position 21 closer to the concave mirror 16 than the reference position 20. In the example of FIG. 3, a distance d1 from the concave mirror 16 to the display 14 is shorter than the reference distance d0. The display 14 can be disposed at the near position 21 by moving the display 14 in the first direction X1 from the reference position 20 by the drive mechanism 18.

In the example of FIG. 3, since the display 14 is disposed at the near position 21 closer to the concave mirror 16 than the reference position 20, a first light beam L1a and a second light beam L2a directed from the concave mirror 16 to the transparent member 30a are not parallel. Specifically, the first light beam L1a and the second light beam L2a travel so as to diverge toward the transparent member 30a. At this time, by appropriately adjusting divergence angles of the first light beam L1a and the second light beam L2a directed to the transparent member 30a, directions (angles) of the first light beam L1a and the second light beam L2a directed from the transparent member 30a to the user E can be matched with each other. As a result, a virtual image 44 can be visually recognized without perceiving a double image due to the deviation between the first light beam L1a and the second light beam L2a. At this time, a virtual image distance of the virtual image 44 visually recognized by the user E is not infinite but finite.

Figure 4:
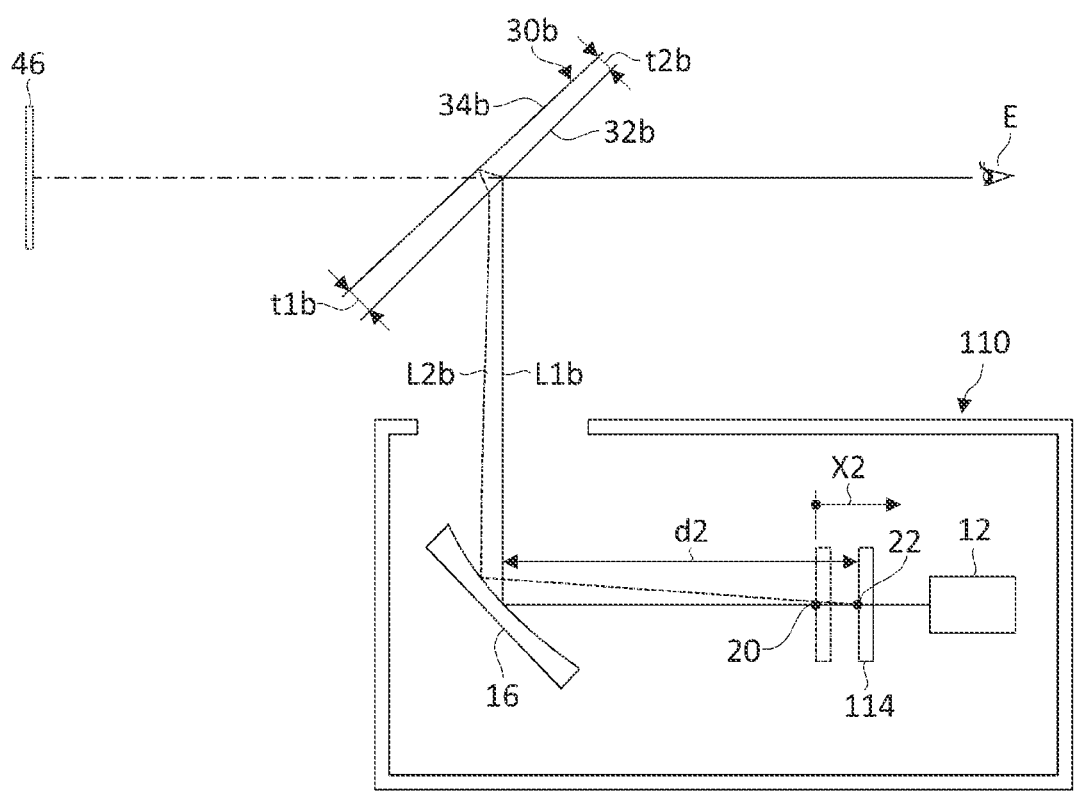
FIG. 4 is a diagram schematically illustrating a case where a display is disposed farther than a reference position in a display device according to a comparative example.

FIG. 4 is a diagram schematically illustrating a case where a display 114 is disposed farther than the reference position 20 in a display device 110 according to a comparative example, and a distance d2 from the concave mirror 16 to the display 114 is longer than the reference distance d0. Unlike the above-described embodiment, the display device 110 in FIG. 4 can move the display 114 in a second direction X2 from the reference position 20, and can dispose the display 114 at a distant position 22. In the above-described embodiment, the display 14 cannot be moved from the reference position 20 in the second direction X2, and the display 14 cannot be disposed at the distant position 22.

In the example of FIG. 4, a transparent member 30b is not parallel, but a magnitude relation between thicknesses t1b and t2b of the transparent member 30b is opposite to that in FIG. 3. Specifically, a wedge shape is formed such that the thickness t1b on the lower side of the transparent member 30b is large and the thickness t2b on the upper side of the transparent member 30b is small. In this case, by disposing the display 114 at the distant position 22 farther than the reference position 20, directions (angles) of the first light beam L1b and the second light beam L2b directed from the transparent member 30b toward the user E can be matched, and a double image due to the deviation between the first light beam L1b and the second light beam L2b can be eliminated.

However, in the example of FIG. 4, the first light beam L1b and the second light beam L2b travel so as to converge toward the transparent member 30b. As a result, a virtual image distance of a virtual image 46 visually recognized by the user E becomes "over infinity" which is farther than infinity, and the user E cannot focus on the virtual image 46. That is, the user E cannot visually recognize a clear image, and the user E tries to forcibly focus on the virtual image, so that an excessive burden is applied to eyes of the user E. In consideration of the burden on the eyes of the user E, it is preferable to avoid such a state. Therefore, in the present embodiment, the display 14 is prohibited from being disposed farther than the reference position 20 in order to avoid a state in which the virtual image is out of focus due to over infinity.

Note that, in the display device 10 according to the present embodiment, when the non-parallel transparent member 30b illustrated in FIG. 4 is used, the double image due to the deviation between the first light beam L1b and the second light beam L2b cannot be eliminated. However, according to the present embodiment, it is possible to prevent the virtual image from being out of focus due to over infinity, and to prevent an excessive burden from being applied to the eyes of the user E.

That is, the drive mechanism 18 enables adjustment of the position of the display 14 from the reference position 20 of the display 14 on the assumption that the front surface 32 and the back surface 34 of the transparent member 30 are parallel to each other in the direction toward the position close to the concave mirror 16, and restricts adjustment in the direction toward the position far from the concave mirror 16. In other words, the drive mechanism 18 enables adjustment of the position of the display 14 with respect to the concave mirror 16 in a direction in which the user perceives the virtual image as a finite distance on the basis of the position at which the user perceives the virtual image as infinity, and restricts adjustment in a direction in which over infinity occurs.

According to the present embodiment, in the case of the strictly parallel transparent member 30 as illustrated in FIG. 1, and in the case of the transparent member 30a having a wedge shape in which the thickness t1a on the lower side is relatively small as illustrated in FIG. 3, the distance from the concave mirror 16 to the display 14 is changed by the drive mechanism 18, so that the double image can be eliminated. According to the present embodiment, in the case of the transparent member 30b having a wedge shape in which the thickness t1b on the lower side is relatively large as illustrated in FIG. 4, although the double image cannot be eliminated, it is possible to prevent occurrence of a situation in which the virtual image distance becomes over infinity and the user E cannot focus on the virtual image. Therefore, according to the present embodiment, a more suitable virtual image can be presented to the user E as compared with a display device in which the distance from the concave mirror 16 to the display 14 is fixed or a display device in which there is no restriction on the change in the distance from the concave mirror 16 to the display 14.

Although the present invention has been described above with reference to the above-described embodiments, the present invention is not limited to the above-described embodiments, and structures obtained by appropriately combining or replacing the structures illustrated in the respective display examples are also included in the present invention.

In the above-described embodiment, the case where only the concave mirror 16 is disposed in the optical path between the transparent member 30 and the display 14 has been described. In another embodiment, another optical element may be added between the display 14 and the concave mirror 16, or a folding mirror, a convex lens, or the like may be added. In a case where a convex lens is added between the display 14 and the concave mirror 16, the reference position 20 of the display 14 is set such that the image display light after passing through the convex lens and being reflected by the concave mirror 16 becomes parallel light.

What is claimed is:

1. A display device comprising:
 a display that generates image display light;
 a concave mirror that reflects the image display light such that the image display light is projected onto a transparent member; and
 a drive mechanism that moves the display in a range including a case where a distance from the concave mirror to the display is a reference distance at which the image display light traveling from the concave mirror to the transparent member becomes parallel light and a case where the distance from the concave mirror to the display is a distance shorter than the reference distance, wherein
 a) in a case where a front surface and a back surface of the transparent member are parallel to each other, the drive mechanism sets a distance from the concave mirror to the display to the reference distance, and
 b) in a case where the front surface and the back surface of the transparent member are not parallel the drive mechanism sets the distance from the concave mirror to the display to the reference distance or a distance shorter than the reference distance.

2. The display device according to claim 1, wherein the drive mechanism enables movement of the display in a range in which the distance from the concave mirror to the display is smaller than or equal to the reference distance, and restricts movement of the display in a range in which the distance from the concave mirror to the display exceeds the reference distance.

3. The display device according to claim 1, wherein the reference distance is a distance from the concave mirror to the display in a case where a front surface and a back surface of the transparent member are parallel to each other, and a user of the display device perceives the image display light projected onto the transparent member as a virtual image at infinity.

* * * * *